United States Patent
Hosseinmostafa et al.

(10) Patent No.: US 9,973,952 B1
(45) Date of Patent: May 15, 2018

(54) MOBILE PHONE PERFORMANCE MANAGEMENT BASED ON PERSONAL QUALITY CRITERIA

(71) Applicant: Sprint Communications Company L.P., Overland Park, KS (US)

(72) Inventors: Ali Reza Hosseinmostafa, Olathe, KS (US); Dwight D. Inman, Travelers Rest, SC (US); Raymond E. Reeves, Oviedo, FL (US)

(73) Assignee: Sprint Communication Company L.P., Overland Park, KS (US)

( * ) Notice: Subject to any disclaimer, the term of this patent is extended or adjusted under 35 U.S.C. 154(b) by 33 days.

(21) Appl. No.: 15/250,817

(22) Filed: Aug. 29, 2016

(51) Int. Cl.
*H04W 24/04* (2009.01)
*H04W 72/04* (2009.01)
*H04W 24/08* (2009.01)
*H04W 24/02* (2009.01)
*H04L 12/26* (2006.01)
*H04W 88/02* (2009.01)

(52) U.S. Cl.
CPC ............. *H04W 24/08* (2013.01); *H04L 43/10* (2013.01); *H04W 24/02* (2013.01); *H04W 72/04* (2013.01); *H04W 88/02* (2013.01)

(58) Field of Classification Search
None
See application file for complete search history.

(56) References Cited

U.S. PATENT DOCUMENTS

| | | | | |
|---|---|---|---|---|
| 2002/0183066 A1* | 12/2002 | Pankaj | ............... | H04W 72/1226 455/453 |
| 2014/0044077 A1* | 2/2014 | Chen | ................ | H04W 72/0426 370/329 |
| 2014/0086073 A1* | 3/2014 | Baykal | ............... | H04L 41/5038 370/252 |
| 2014/0293789 A1* | 10/2014 | Machida | ............... | H04L 45/121 370/235 |
| 2015/0074286 A1* | 3/2015 | Anschutz | ............. | H04L 45/308 709/240 |
| 2015/0131483 A1* | 5/2015 | Colban | ................. | H04W 48/16 370/254 |
| 2015/0163811 A1* | 6/2015 | Konstantinou | ..... | H04W 76/026 370/329 |
| 2017/0048789 A1* | 2/2017 | Tan | ....................... | H04W 36/30 |

* cited by examiner

*Primary Examiner* — Candal Elpenord (57) ABSTRACT

A user equipment (UE). The UE comprises a client application that presents prompts to guide a user through inputting a personal quality metric definition, transmits personal quality metric definition inputs via the radio transceiver, creates data based on wireless communication service experienced by the UE, transmits the performance data to one of a server application or a data store, receives a personal quality metric from the server application, where the personal quality metric represents the quality of wireless communication service received by the UE based on the quality metric definition inputs and performance data transmitted by the UE to the server application or the data store and based on the performance data transmitted by other UEs to one of the server application or the data store, and presents the personal quality metric on a display.

20 Claims, 6 Drawing Sheets

MOBILE PHONE PERFORMANCE MANAGEMENT BASED ON PERSONAL QUALITY CRITERIA

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communications (e.g., mobile cellular communications) technology is continuously improving and rolling out new and more advanced protocols to both operate network infrastructure efficiently and please service subscribers. Mobile virtual network operators (MVNOs) are wireless service provider businesses that do not own and operate their own wireless network infrastructure but instead lease usage of the wireless network infrastructure owned by other service providers. The MVNOs offer wireless service directly to wireless communication subscribers and bill these subscribers, but the wireless communication traffic of those subscribers is carried on wireless network infrastructure the MVNOs lease from others.

Some MVNOs provide a network-of-networks service to subscribers. An MVNO, for example, may lease wireless network infrastructure from a variety of different wireless network infrastructure enterprises and associate subscribers to these different wireless network infrastructures dynamically, for example moving a subscriber from a first wireless network infrastructure to a second wireless network infrastructure and then later from the second wireless network infrastructure to a third wireless network infrastructure, for example to obtain advantageous lease pricing and/or to obtain better quality of service for its subscribers.

Wireless communication quality has many different components. Data download speed, voice call quality, dropped call frequency, blocked call frequency, latency, jitter, buffer behavior, and others. Different users have different sensitivities to these different components of quality. A first user may be happy if voice call quality is high and may be indifferent to high or low data communication quality parameters. A second user may be an avid gamer and be less sensitive to voice quality and more sensitive to latency and/or buffering behavior. Thus, to some extent, the user experience of different subscribers on the same network infrastructure may have different subjective experiences of communication quality.

SUMMARY

In an embodiment, a computer system for analyzing mobile communication performance data from a plurality of different wireless communication service provider networks to provide competitive comparison information to user equipment (UE) users for use in choosing to subscribe with a wireless communication service provider is disclosed. The computer system comprises a processor, a non-transitory memory; and an application stored in the non-transitory memory. When executed by the processor, the application reads performance data from a data store, where the performance data comprises wireless communication service performance data collected by a client application executing on each of a plurality of UEs and transmitted by the client application to the data store irrespective of the wireless communication service provider network from which the associated UE receives wireless coverage, each of the different wireless communication service provider networks provide wireless communication service to at least some of the plurality of UEs, the performance data identifies one of the wireless communication service provider networks as being the context of the performance data, and the performance data comprises network download speed of the wireless communication service provider network that is the context of the performance data. The application further analyzes the performance data read from the data store to determine performance statistics for each of the different wireless communication service provider networks, where one of the performance statistics comprises a data download speed performance statistic and receives a personal quality criteria from each of the plurality of UEs, where each personal quality criteria defines the wireless communication service quality factors that matter to a user of a corresponding UE. The application further determines a personal quality metric for each of the different wireless communication service provider networks for each of the plurality of UEs based on the personal quality criteria associated with the UE and based on the performance statistics and transmits the personal quality metrics determined for a first UE to the first UE in response to receiving a request for the metrics from the first UE, whereby a choice by a user of the first UE to subscribe to one of the wireless communication service providers is informed by the personal quality metrics sent to the first UE.

In another embodiment, a user equipment (UE) is disclosed. The UE comprises a radio transceiver, a processor, a display, a non-transitory memory, and a client application stored in the non-transitory memory. When executed by the processor, the client application presents prompts on the display to guide a user through inputting a personal wireless communication service quality metric definition associated to the user, where the personal wireless communication service quality metric definition defines wireless communication service quality factors that matter to a user of the UE, receives personal wireless communication service quality metric definition inputs, and transmits the personal wireless communication service quality metric definition inputs to one of a server application or a data store via the radio transceiver. The client application further creates wireless communication service performance data based on wireless communication service experienced by the UE, where the performance data comprises an identity of a wireless communication service provider network that is a context for the performance data and transmits the wireless communication service performance data to one of the server application or the data store. The client application further receives a personal wireless communication service quality metric from the server application, where the personal quality metric represents the quality of wireless communication service received by the UE based on the quality metric definition inputs and wireless communication service performance data transmitted by the UE to the server application or the data store and based on the wireless communication service performance data transmitted by other UEs irrespective of the wireless communication service provider network from which the UEs receive wireless coverage to one of the server application or the data store, and presents the personal wireless communication service quality metric on the display, whereby a user of the UE is able to make an informed choice of one of a wireless communication service providers to subscribe to.

In yet another embodiment, a method of managing user equipment wireless communication service performance based on a personal quality criteria is disclosed. The method comprises reading performance data from a data store, where the performance data comprises wireless communication performance data transmitted to the data store by a plurality of user equipments (UEs) irrespective of which of a plurality of different wireless communication service provider networks the UEs receive wireless coverage from, the performance data identifies a wireless communication service provider network that is the context of the performance data, and the performance data comprises at least three of a network download speed, data reliability data, dropped calls data, call blocking data, and data buffering data. The method further comprises receiving a plurality of personal wireless communication service quality metric definitions, wherein each personal wireless communication service quality metric definition identifies at least one performance data item and weighting pair, whereby wireless communication quality factors that matter to a user of a UE are defined, calculating personal quality metrics for each of the plurality of wireless communication service provider networks for each of the plurality of received personal wireless communication service quality metric definitions, where each personal quality metric is calculated based on the associated metric definition and the performance data read from the data store, and configuring a network-of-networks comprised of the plurality of wireless communication service provider networks to provision at least some of the UEs to the service provider network associated with the highest personal quality metric for each UE and wherein at least some of the UEs are provisioned to different service provider networks at different times to maintain a high personal quality metric for the UEs under different operating conditions.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A system for managing wireless communication service quality for user equipment (UEs) based on a personal quality criteria is taught herein. A user may consent to have a personal quality metric client application installed on his or her UE, for example a mobile phone or other mobile communication device. This client application may prompt the user to define a personal wireless communication service quality metric by defining a formula for calculating the personal quality metric, for example based on calculating a sum of weighted communication quality parameters where the user specifies the weighting (e.g., importance) he or she ascribes to each parameter. This definition or formula may also be referred to as a personal quality criteria. The personal quality criteria defines or describes the wireless communication quality factors that matter to a user of the UE and how much they matter. The personal quality metric definition is transmitted by the client application to a corresponding server application executing on a computer system irrespective of what wireless communication service provider provides wireless coverage to the UE. The client application may collect performance data from the UE and send that to the server application. The client application may collect performance data from a modem and/or radio transceiver of the UE, for example through making operating system calls to modem and/or radio transceiver. The client application transmits the collected performance data to the server application, for example via a wireless communication link provided by an enhanced node B (eNB) or cell site and then via a communication network to the computer system hosting the server application. It is understood that the behavior described above for a single UE is repeated by a plurality of UEs, each having a personal quality metric client application installed and each transmitting performance data it has collected to the server application irrespective of which of a plurality of different wireless communication service providers provide wireless coverage to the UEs.

The performance data comprises an identity of the UE and an identity of a wireless communication service provider and/or an identity of a wireless network. The performance data may further comprise an identity of a location where the subject performance data was collected. The location of where the performance data was collected may also be considered to be a context of the performance data. It is understood that a UE will collect multiple instances of performance data and that each unit of performance data may identity a different location where the performance data was collected and may identify a different wireless communication service provider and/or a different wireless network (e.g., the UE may be migrated over time to different wireless networks, for example when subscribed to receive service from a network-of-networks service provider).

The server application reads appropriate wireless communication service performance data for the subject user from a data store (e.g., performance data sourced from the subject UE itself and optionally other cooperating UEs that have a like client application installed), calculates values of one or more quality parameters based on the performance data sourced from the subject UE and optionally sourced from other cooperating UEs, calculates a personal quality metric for the UE by weighting the quality parameters according to the personal quality metric definition, and sends the determined personal quality metric to the client application.

In an embodiment, the server application may calculate a personal quality metric for the UE based solely on the performance data supplied by that UE and a separate personal quality metric (e.g., a comparison personal quality metric) based solely on the performance data supplied by other cooperating UEs. Providing these two different personal quality metrics may promote the user of the UE to compare his or her quality of service to the quality of service received by other UEs, where the comparison is made in the context of the personal quality matric defined by the user (i.e., in the context of the personal quality criteria defined by the user). In an embodiment, the calculation of the comparison personal quality metric is based solely on performance data supplied by other cooperating UEs operating in the same general geographical area as the subject UE or based solely on performance data having a location identity corresponding to the general geographical area of the location identity provided in the subject UE's performance data sourced from other cooperating UEs.

In an embodiment, the UE may receive wireless communication service from a network-of-networks service provider and may receive wireless coverage from a plurality of different wireless network infrastructures (i.e., the different wireless network infrastructures that the network-of-networks service provider relies upon to deliver wireless communication service to its subscribers, including the subject UE). The server application may calculate a plurality of personal quality metrics for the UE, an overall personal quality metric for the overall personal quality experienced on all wireless network infrastructures and individual network personal quality metrics for each individual wireless network infrastructure that the UE is served by. The server application may additionally calculate a plurality of personal quality metrics for other cooperating UEs, for example an overall personal quality metric for the overall personal quality experienced on all wireless network infrastructures by the other UEs and individual network personal quality metrics for each individual wireless network infrastructure that the UEs are served by. These different personal quality metrics, likewise, may be transmitted by the server to the UE for presentation. It will be appreciated that network specific personal quality metric scores may assist the user of the UE to select a preferred wireless network infrastructure to be attached to by the network-of-networks service provider. Alternatively, the network-of-networks service provider itself may use these network specific personal quality metric scores to associate the UE primarily with one specific wireless network infrastructure.

The data in the data store may comprise performance data provided by different UEs that have like personal quality metric client applications installed (i.e., what are referred to as cooperating UEs above). For example, the client application may collect performance data pertaining to the wireless communication service quality experienced by the UE and periodically transmit the collected performance data to the server application or to another application for storage in the data store. The service subscriber or user may be able to control or define his or her level of sharing of performance data. The subscriber may limit what kinds of performance data is to be shared via the client application with the data store. For example, the user may elect to share performance data with the data store but withhold location information associated with the shared performance data or restrict location information to a gross location characterization (e.g., location within a radius of 5 miles, location within a radius of 20 miles, location within defined metropolitan regions, or other locational delimitation). The user may elect to share some kinds of performance data but not other kinds of performance data.

The client application may promote the user self-identifying as a member of a group or category of wireless communication service consumers. Alternatively, the client application may be configured to infer a membership of the user in a group or category of wireless communication service consumers based on monitoring communications performed by the UE. The categories of wireless service consumers may comprise voice only consumers, heavy content downloaders, social networkers, gamers, media streamers, and other categories. The server application may determine quality parameters such as statistical figures (e.g., medians, standard deviations, averages, and the like), such as periodic rates, such as busy hours, on the stored performance data for members of the user's category of wireless service consumers. The server application may periodically determine or re-determine these quality parameters. For statistics based on performance data sourced from other cooperating UE, the server application may determine these statistical figures based on a random sampling of performance data from members of the different categories, whereby to reduce a processing load for determining the statistical figures. The statistics may be calculated over windows of time, for example using performance data collected over a most recent year, over a most recent quarter, over a most recent month, or over a most recent week.

The server application may use these statistical figures of other members of the user's category of wireless service consumers based on the user's defined personal quality metric to calculate a category-wide personal quality metric and provide this category-wide personal quality metric to the client application for comparison with the user's personal quality metric, where the user's personal quality metric would be determined solely on performance data associated with that user. Thus, this determination can answer the question how does the user's wireless communication experience compare with that of the wireless communication experience of other members of his or her communication category—as determined using this user's defined personal quality calculation.

The quality parameters (e.g., statistical summary metrics determined from performance data comprising medians, averages, standard deviations for the different performance data collected by the wireless network infrastructures) for each of the different wireless network infrastructures may also be transmitted to the client application for presentation to the user. In this way, for example, the subscriber may be able to directly compare the data download speeds provided by each of a plurality of different wireless network infrastructures, whereby to choose a preferred wireless network infrastructure based on superior download speed. Like determinations may be made for other quality parameters, for example voice quality, jitter, latency, buffering, call drop rate, call block rate—whereby the subscriber may be enabled to make an informed choice between different network infrastructures.

It is understood that the above described system can readily be applied to a traditional wireless service subscription environment where the UE is quasi-permanently attached to a single wireless network infrastructure (with the exception, of course, of roaming service). For example, the server application may analyze performance data supplied by the subject UE on its current wireless network infrastructure (and optionally analyze performance data sourced by other cooperating UEs that receive service from the same current wireless network infrastructure), determine quality parameters based on the subject UE's performance data (and optionally the performance data supplied by other cooperating UEs that receive coverage from the same current wireless network infrastructure), and determine a personal quality metric for the UE on the current wireless infrastructure network based on the quality parameters determined solely from performance data related to the current wireless network infrastructure. The server may also analyze performance data supplied by other cooperating UEs on different wireless network infrastructures, determine quality parameters for each of the different wireless network infrastructures based on the data supplied from those other cooperating UEs, and calculate personal quality metrics per network infrastructure for each of those different wireless network infrastructures.

The server can then provide all of this information to the UE. This promotes the UE comparing its personal quality metric in its wireless network infrastructure to personal quality metrics—calculated based on the same user defined criteria—of other UEs for other wireless network infrastructures as well as comparing quality parameters associated with the current wireless network infrastructure with quality parameters associated with other wireless network infrastructures. This may promote the user determining that competing wireless service provider B can provide better service—in terms of the user's own criteria definition—than the current wireless service provider with whom the UE is currently subscribed. For example, the user may be particularly sensitive to fast data download speeds and may determine that service provider B supports faster data download speeds than its current service provider, and hence may decide to change his or her subscription to service provider B.

In an embodiment, the network-of-networks service provider may shift a UE from one wireless network infrastructure to another for purposes of collecting per network performance data from the UE. This performance data collected on multiple different wireless network infrastructures may then be used by the network-of-networks service provider to associate the UE with the wireless network infrastructure associated with the highest personal quality metric for the UE. The network-of-networks service provider may do this with new subscribers. It is understood that the performance data identifies the wireless communication service provider and/or wireless network infrastructure in which the subject performance data was collected and which hence provides the context for the subject performance data. The performance data may further comprise an identity of a location of where the performance data was collected, for example an identity of an eNB or a cell tower providing wireless coverage to the UE at the time the performance data was collected (the identity of the service cell site can be associated to the location of the serving cell site which is an approximation or proxy for the exact location of the UE). After this initial rotation across network infrastructures and settling the UE on a preferred network infrastructure, the network-of-networks service provider may occasionally repeat the rotation of the UE to different network infrastructures to check if the preferred network infrastructure for that UE may have changed, for example quarterly, twice a year, annually, or on some other periodic interval. Alternatively, the network-of-networks service provider may rotate a UE to different network infrastructures on an aperiodic basis, for example in response to a triggering event produced by the UE (for example, the UE moves from a first region to a second different region) of in response to an event in one of the networks relied upon by the network-of-networks service provider.

The various processing described above is inextricably tied to computer technology to implement and enact the desired benefits. The various features can contribute to a user enjoying and benefiting from a better quality of communication—where the criteria of what constitutes better quality is defined by the user. One size does not fit all. Different wireless communication consumers have different desires and preferences for quality communication. The system taught herein contributes to delivering to each user more of what that specific user prefers. In an embodiment, this may be accomplished by a network-of-networks service provider placing each different UE on the wireless network infrastructure that best achieves the associated user's quality preferences.

In prior art systems, typically network performance is measured from the network side for a defined set of data and parameters. For example, performance data such as that described above is typically collected by cell sites maintained and owned by an individual service provider and funneled to a computer system maintained by the same individual service provider to analyze the performance data. This data is not shared between network providers, and each network may collect its own data and parameters for metrics. This makes it more difficult to understand local conditions as well as difficult to compare networks since the various providers do not fully cooperate. By creating a client application which runs or can be configured to run across multiple carriers and which includes monitoring and reporting raw performance data from the device side, data relevant to multiple networks of multiple carriers can be monitored and assembled. By having the device side client application also automatically identify and add to its data a device identifier, the identity of the carrier network it is running on, and the relevant geography or towers for each of its data points being provided the raw data across all network carriers can be assembled and provided in a manner supporting flexible performance analysis from a common database and data base structure.

Additionally, to address the problem of inconsistent and not necessarily personally relevant network performance metrics, a structure is provided to support each user having the ability to pick from a defined set of options and/or weightings of performance metrics, have the system select the most relevant of a defined set based on the device's usage patterns, or define their own set of performance characteristics. By using the device side client applications across multiple networks with a common data store of raw data where each data point is also attached to identifying performance data about the network, the location, and the device this common data set may be used to respond to specific metrics defined by each UE on its own terms. By also using the device side client application on the requesting UE to analyze its own behavior both in how it is using its own network and where it is using its own network—the analysis can be automatically applied to the most relevant geographies of the data and in some cases (where the system helps select the most relevant performance metric) the analysis is applied using the most relevant performance metric based on the device's own usage.

Finally, this combination supports the possibility in a network-of-networks to monitor the specific performance metrics and (potentially combined with user or provider thresholds and potentially price/cost information) to dynamically adapt which network within the network-of-networks a device is being carried on in response to changes in the device's activity, location, or the ongoing performance of the various networks across a larger set of devices. This last adds the requirement of a system monitoring overall network data based on each of the user defined networks watching for changes and triggering actions based on changes past a threshold amount and a client on the device or on the network which is set to receive input from the monitor and shift the device between networks in the network of networks.

Figure 1:
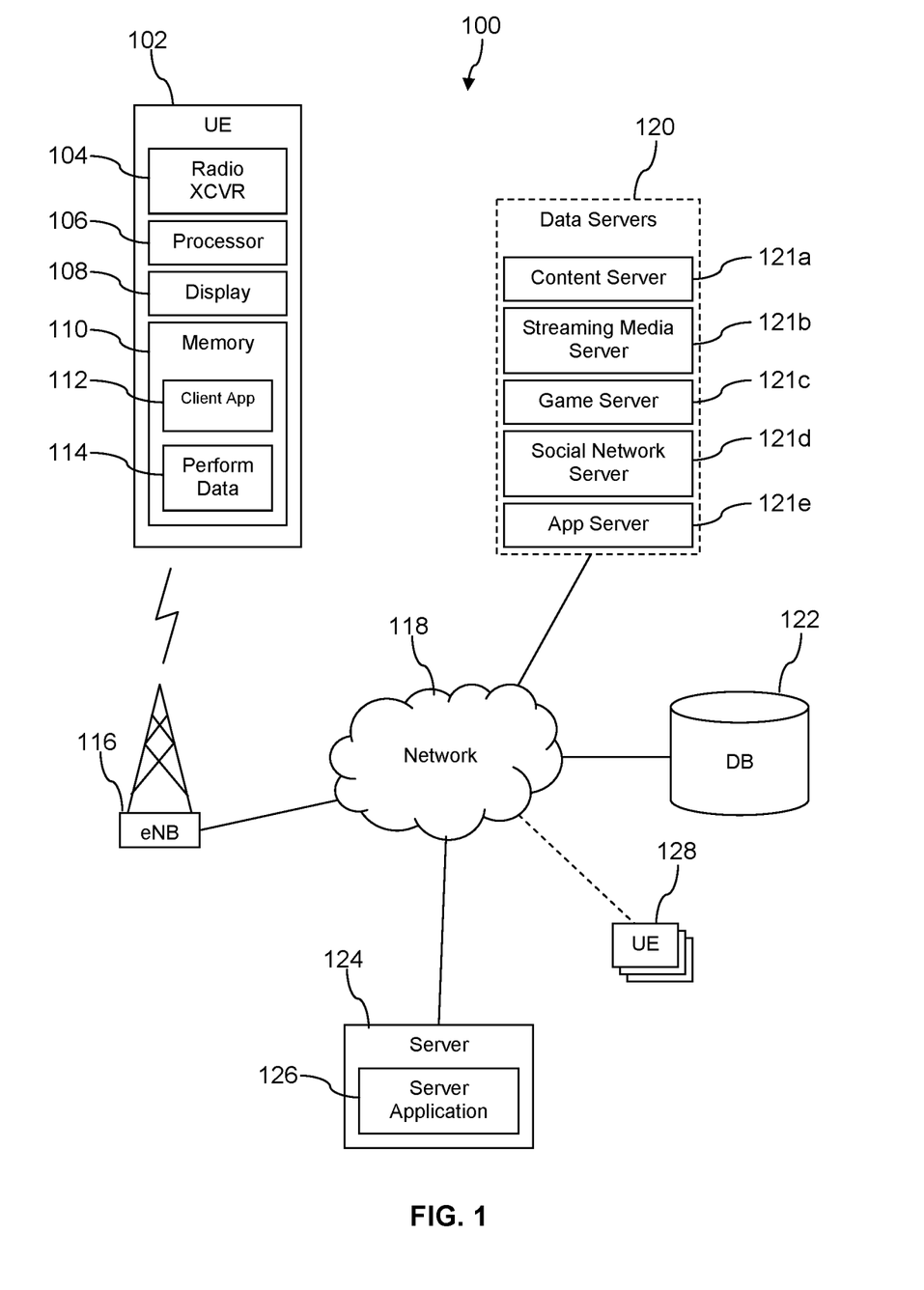
FIG. 1 is a block diagram of a communication system according to an embodiment of the disclosure.

Turning now to FIG. 1, a communication system 100 is described. In an embodiment, the system 100 comprises a user equipment (UE) 102 that comprises a radio transceiver 104, a processor 106, a display 108, a memory 110, a personal quality metric client application 112 stored in the memory 110, and optionally performance data 114 stored in the memory 110. At least a portion of the memory 110 may be a non-transitory memory, e.g., a memory that retains its data contents through a power off-power on cycle. The system further comprises an enhanced node B (eNB) 116 or cell site, a network 118, a plurality of data servers 120, a data store 122, and a personal quality metrics server 124 that executes a personal quality metrics server application 126. In an embodiment, the data servers 120 may comprise one or more content servers 121a, one or more streaming media servers 121b, one or more game servers 121c, one or more social network servers 121d, and one or more application servers 121e. In an embodiment, the system 100 further comprises a plurality of other UEs 128.

The UE 102 may be a mobile phone, a feature phone, a smart phone, a personal digital assistant (PDA), a media player, a headset computer, a wearable computer, a laptop computer, a tablet computer, or a notebook computer. Likewise, the other UEs 128 may comprise any combination of mobile phones, feature phones, smart phones, PDAs, media players, headset computers, wearable computers, laptop computers, tablet computers, or notebook computers. The network 118 comprises one or more private networks, one or more public networks, or a combination thereof. In an embodiment, the network 118 comprises a plurality of wireless communication network infrastructures, for example wireless communication network infrastructures operated by different wireless communication service provider companies. In an embodiment, a network-of-networks service provider provides wireless communication service to the UE 102 relying upon one or more of the plurality of wireless communication network infrastructures of which the network 118 is comprised. The network-of-networks service provider may also provide wireless communication service to one or more of the other UEs 128 relying upon one or more of the plurality of wireless communication network infrastructures of which the network 118 is comprised.

The data servers 120 may provide data communication to the UE 102 and/or the other UEs 128. The content server 121a may provide content referenced by universal resource locators (URLs) sent by a web browser application executing on the UE 102 or the other UEs 128. The streaming media server 121b may provide streaming video to the UE 102 and/or the UEs 128, for example to enable the UE 102 to watch a movie on the display 108 or to listen to music. The game server 121c may provide interactive multi-party gaming services to a gaming application that executes on the UE 102 and/or the other UEs 128. The social network server 121d may provide social networking communication services for the UE 102 and/or the other UEs 128. The application servers 121e may provide various support for client applications that may execute on the UE 102 and/or the other UEs 128. It will be appreciated that the different communication content supported by the data servers 120 may rely upon different communication attributes to provide a good user experience. For example, jitter may be undesirable in providing streaming video service but maybe irrelevant when providing content downloads.

The eNB 116 may provide a wireless communication link to the UE 102 to communicatively couple the UE 102 to the network 118, to conduct voice calls and/or data calls. Data calls may comprise the UE 102 using the wireless communication link provided by the eNB 116 to download content from content servers 121a, to engage in social networking via a social networking server application executing on the social network server 121d, or to receive streaming audio or video services from a media server application executing on a streaming media server 121b. The UE 102 may use the wireless communication link provided by the eNB 116 to obtain a virtual private network (VPN) connection to an enterprise site, for example an employer site (not shown). The eNB 116 may provide the wireless communication link to the UE 102 according to at least one of a long term evolution (LTE), a code division multiple access (CDMA), a global system for mobile communications (GSM), or a worldwide interoperability for microwave access (WiMAX) wireless telecommunications protocol.

The other UEs 128 may have personal quality metric client applications installed and may report or source performance data they collect via their client application to the personal quality metrics server application 126 or to the data store 122. The server application 126 may store performance data received from the other UEs 128 to the data store 122. In an embodiment, the UE 102 may receive wireless communication according to a traditional quasi-permanent arrangement (e.g., under a 2 year contract service plan) from a single wireless network infrastructure (excepting occasional roaming). In a similar way, in an embodiment, at least some of the other UEs 128 may receive wireless communication according to a traditional quasi-permanent arrangement from a single wireless network infrastructure, but possibly from different infrastructures. Thus, the UE 102 may associate to a first infrastructure, a first other UE 128 may associate to a second infrastructure, and a second other UE 128 may associated to a third infrastructure.

Alternatively, the UE 102 may not be party to a traditional quasi-permanent arrangement and instead may receive wireless communication service from a plurality of different wireless network infrastructures via the mediation of a network-of-networks service provider that the UE 102 does have an agreement with. At least some of the other UEs 128, too, may receive service from a plurality of infrastructures via the mediation of a network-of-networks service provider.

In an embodiment, the personal quality metric client application 112 may be installed on the UE 102 after initial activation. In an embodiment, the personal quality metric personal quality metric client application 112 may be downloaded via the radio transceiver 104 by a subscriber and installed on the UE 102 as a user application. The personal quality metric client application 112, or the personal quality metric client application 112 for conciseness, provides functionality related to determining a personal quality metric and sharing performance data 114 with the data store 122.

The client application 112 may provide a user interface on the display 108 to guide the subscriber through the process of defining a personal quality criteria and/or a personal wireless communication service quality metric, for example defining a plurality of weightings or coefficients to multiply times various quality parameters to determine a personal quality metric. Some weightings or coefficients may be zero valued, as for example when the subscriber does not care at all about a particular quality parameter. Higher values may be assigned to quality parameters that the subscriber cares more about. After the subscriber has completed defining the weightings, the client application 112 may transmit the definition of the personal quality criteria or personal quality metric to the personal quality metric server application 126 for storage on the server 124 and/or in the data store 122.

The personal quality metric client application 112 may provide a user interface on the display 108 to guide the subscriber through defining a commitment level for sharing performance data. When the user definition of commitment level is saved, the personal quality metric client application 112 restricts transmission of performance data of the UE 102 according to the user defined commitment level.

The subscriber may wish to restrict her or his sharing of performance data in various ways. The subscriber may wish to disassociate an identity of the UE 102 from the shared performance data. The subscriber may wish to disassociate the identity of the UE 102 from the shared performance data but be willing to associate the shared performance data with a broad user category—for example a gamer user category, a down loader user category, a primarily voice call user category, a social networking user category, a streaming media user category, or another category. The subscriber may wish to restrict shared performance data to specific items of performance data.

The subscriber may wish to withhold any location information from his or her sharing of performance data. The subscriber may be willing to provide coarse location information but not precise location information, for example location information that is within a 5 mile radius or a 10 mile radius or a 15 mile radius of the current location of the UE 102. The subscriber may define location information to be randomly provided within an annulus defined as the zone between two different radii—between 2 miles and 5 mile, between 4 mile and 10 miles, between 6 miles and 15 miles. This may sufficiently blur the actual location of the UE 102 to make the subscriber comfortable while still providing valuable locational information, for instance for determining a relationship between location of the UE 102 and the personal quality metric and/or the performance data. For example, this may be sufficient allow the personal quality metric server application 126 to determine that the UE 102 experiences a diminished personal quality metric in north Kansas City but experiences an enhanced personal quality metric in south Kansas City.

The personal quality metric client application 112 collects performance data based on wireless communication service received by the UE 102. For example, the personal quality metric client application 112 collects performance data of the UE 102 by monitoring operation of the radio transceiver 104 and/or a modem of the UE 102, for example via making operating system calls on the UE 102. This performance data comprises one or more of data related to network data download speed, data download reliability, voice quality, jitter, latency, buffering, call drops, call blocks, video graphic resolution level, and the like. In an embodiment, the personal quality metric client application 112 may preprocess the performance data, for example condensing and digesting the raw performance data into total counts and/or rates, and provide the preprocessed performance data to the data store 122 and/or to the personal quality metric server application 126. Alternatively, the personal quality metric client application 112 may provide the raw unprocessed performance data.

The personal quality metric client application 112 periodically or on event transmits the performance data that it has collected to the personal quality metric server application 126 or to the data store 122. For example, the personal quality metric client application 112 may transmit the collected performance data hourly, daily, weekly, monthly, or on some other periodic interval. The personal quality metric client application 112 may transmit the collected performance data after a threshold volume of data has been collected. The personal quality metric server application 126 may store the performance data received from the UE 102 and optionally from the other UEs 128 in the data store 122.

The personal quality metric server application 126 analyzes the performance data collected by the UE 102 and the other UEs 128 as well as the personal quality criteria or definition of the personal quality metric of the UE 102 and optionally of the other UEs 128. This analysis may comprise determining statistical figures such as medians, averages, and standard deviations for performance data across all reporting wireless network infrastructures. This analysis may further comprise determining such statistical figures for performance data on a per wireless network infrastructure basis (i.e., metrics for each network infrastructure based on only performance data associated with that network infrastructure). This statistical information is generally referred to as quality parameters. The personal quality metric server application 126 then determines a personal quality metric for the UE 102 based on using the personal quality metric criteria or definition provided by the UE 102 and based on performance data read from the data store 122, for example based on the statistical figures and/or quality parameters determined as described above.

A personal quality metric definition may comprise a formula in a sum of weighted factors format:

$$PQM=\Sigma(w_i)(f_i) \qquad \text{EQ 1}$$

where $w_i$ is the i-th weighting or coefficient and $f_i$ is the i-th quality parameter. It is understood that in other embodiments, a different personal quality metric definition formula structure may be employed.

The system 100 described above can provide a variety of information to the UE 102 and to a service provider, for example to a network-of-networks service provider or to a wireless communication service provider. A personal quality metric representing the experience of the UE 102 on a single wireless network infrastructure (e.g., in the traditional quasi-permanent wireless service arrangement associated primarily to one infrastructure) based on the performance data of only the UE 102 can be provided to the UE 102. This same metric can be determined based on performance data of the UE 102 and on the performance data of other UEs 128 from their wireless coverage in the same infrastructure and provided to the UE 102. Personal quality metrics representing the experience of other UEs 128 on other wireless network infrastructures can be determined based on the performance data shared by these other UEs 128 from their different infrastructure and based on the personal quality criteria or equation definition of the UE 102 and provided to the UE 102 for comparison.

If the UE 102 is served by a network-of-networks service provider, the personal quality metric representing the experience of the UE 102 across all the wireless network infrastructures it receives coverage from can be determined based solely on the performance data sourced by the UE 102 and provided to the UE 102. The personal quality metric of the UE 102 can be calculated and presented separately for each of the different infrastructures the UE 102 receives coverage from—personal quality metric per network. The UE 102 can be provided with personal quality metric per network values based on performance data shared by other UEs 128 receiving coverage from these wireless network infrastructures.

In addition to receiving and presenting any combination of these personal quality metrics, the UE 102 may receive quality parameters, for example statistical medians, averages, and standard deviations determined from the shared performance data. These shared quality parameters may be overall (calculated across all infrastructures) based on performance data shared by the UE 102 or overall based on performance data of not just the UE 102 but other UEs 128. These shared quality parameters may further comprise per network quality parameters. From such per network quality parameters the UE 102 may be able to determine which wireless network infrastructure provides the fastest data download speed, which infrastructure provides the lowest jitter, which infrastructure provides the best voice quality, and so on.

It is observed that a network-of-networks service provider or a traditional wireless service provider offering wireless communication service over its own wireless network infrastructure can use this data that is provided to the UE 102 and other peer UEs 102 to improve their wireless service quality in the light of improved understanding of subscriber quality perceptions. This insight can be arrived at by analyzing the personal quality metrics of its subscribers and attempting to maximize the aggregate of these metric scores.

Figure 2:
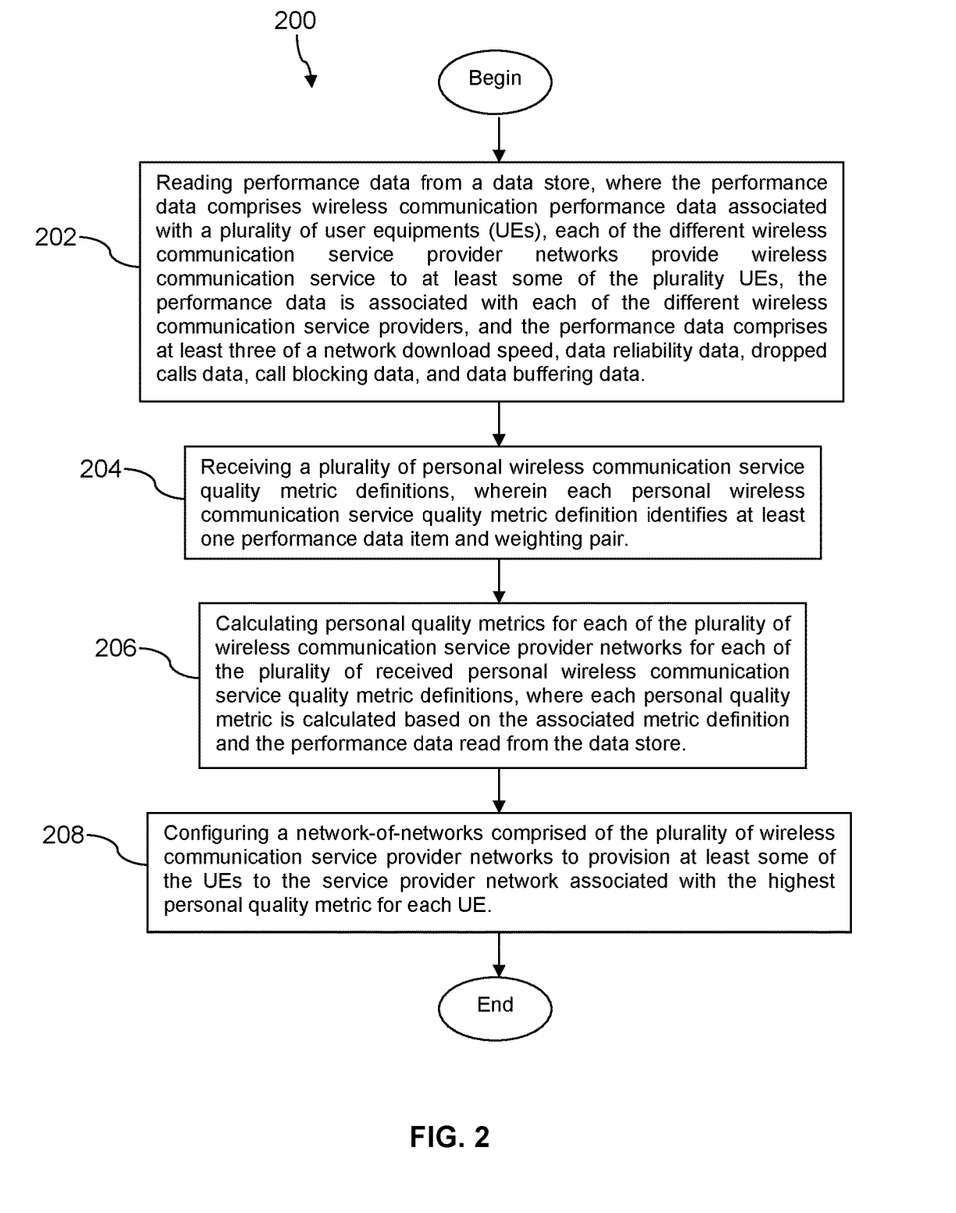
FIG. 2 is a flow chart of a method according to an embodiment of the disclosure.

Turning now to FIG. 2, a method 200 is described. In embodiment, method 200 may be performed by a server computer. At block 202, reading performance data from a data store, where the performance data comprises wireless communication performance data associated with a plurality of user equipments (UEs), each of the different wireless communication service provider networks provide wireless communication service to at least some of the plurality UEs, the performance data is associated with each of the different wireless communication service providers, and the performance data comprises at least three of a network download speed, data reliability data (i.e., data download reliability data), dropped calls data, call blocking data, and data buffering data. At block 204, receiving a plurality of personal wireless communication service quality metric definitions, wherein each personal wireless communication service quality metric definition identifies at least one performance data item and weighting pair. The personal quality metric definition may also be referred to as a personal quality criteria. As an example, a performance data item and weighting pair maybe (1) network download speed and (2) a weighting factor value of 0.3. As another example, a personal quality metric definition or personal quality criteria might be: PQM=(0.3)(network download speed)+(0.6)(voice call quality)+(0.1)(data download reliability). This same PQM may be represented as this sum plus all of the other quality parameters multiplied by a weighting factor of 0.0. Thus: PQM=(0.3)(network download speed)+(0.6)(voice call quality)+(0.1)(data download reliability)+(0.0)(jitter)+(0.0)(latency)+(0.0)(dropped calls)+(0.0)(blocked calls)+(0.0)(data buffering).

In an embodiment, the quality parameters may be normalized to be constrained within a common range, for example a range from 0 to 1, from 0 to 10, or from 0 to 100, or some other range. The weighting factors may also be constrained to some range from 0 to 1, from 0 to 10, or some other range. In an embodiment, the weighting factors are constrained to sum up to a maximum value of 1.0 in any personal quality criteria.

At block 206, calculating personal quality metrics for each of the plurality of wireless communication service provider networks for each of the plurality of received personal wireless communication service quality metric definitions, where each personal quality metric is calculated based on the associated metric definition and the performance data read from the data store. At block 208, configuring a network-of-networks comprised of the plurality of wireless communication service provider networks to provision at least some of the UEs to the service provider network associated with the highest personal quality metric for each UE.

Figure 3:
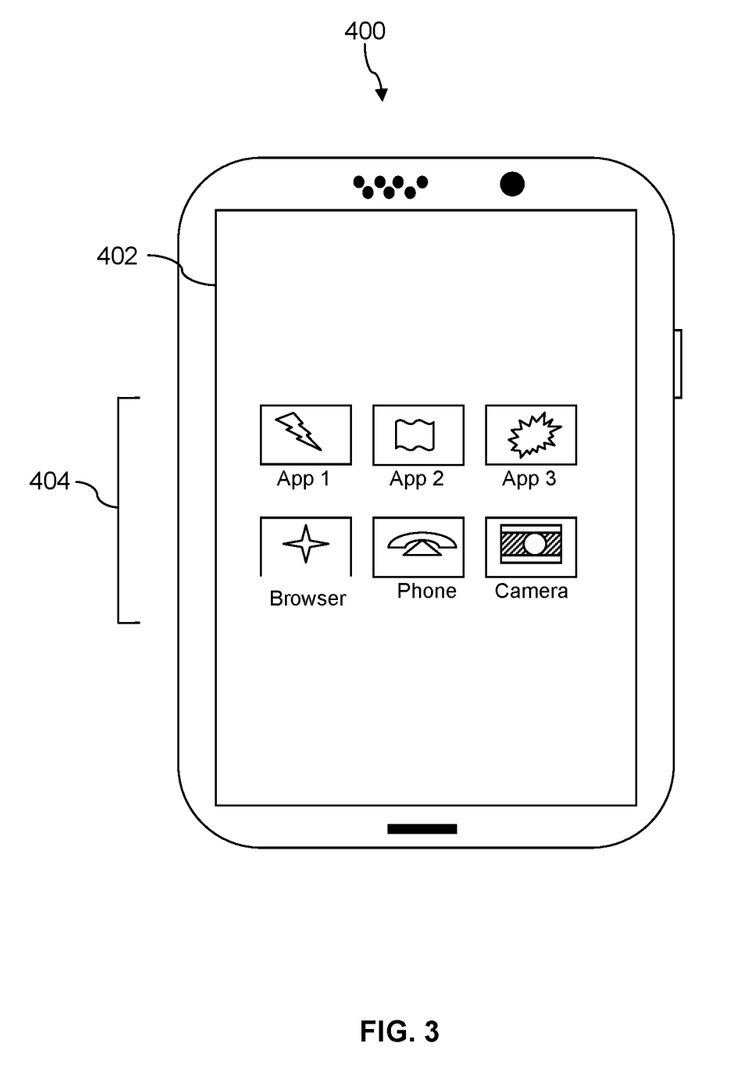
FIG. 3 is an illustration of a user equipment according to an embodiment of the disclosure.

FIG. 3 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touchscreen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 4:
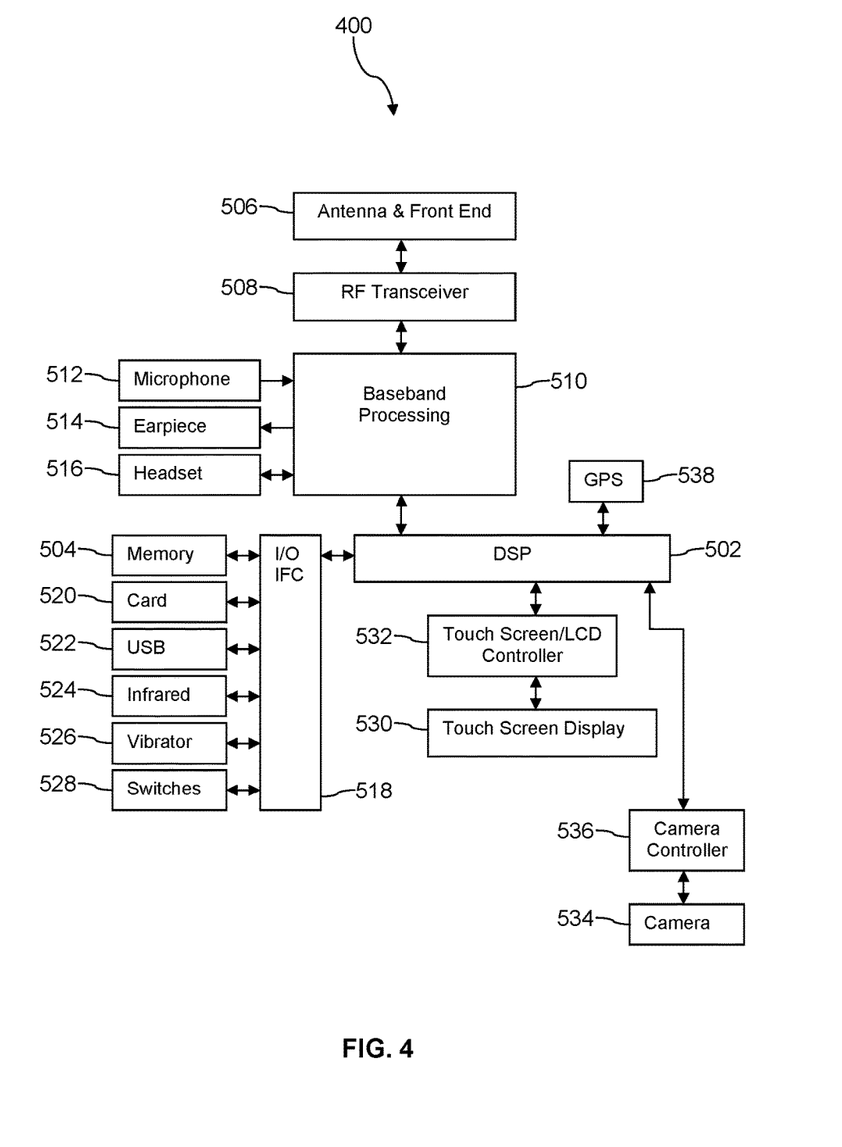
FIG. 4 is a block diagram of a hardware architecture of a user equipment according to an embodiment of the disclosure.

FIG. 4 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 5A:
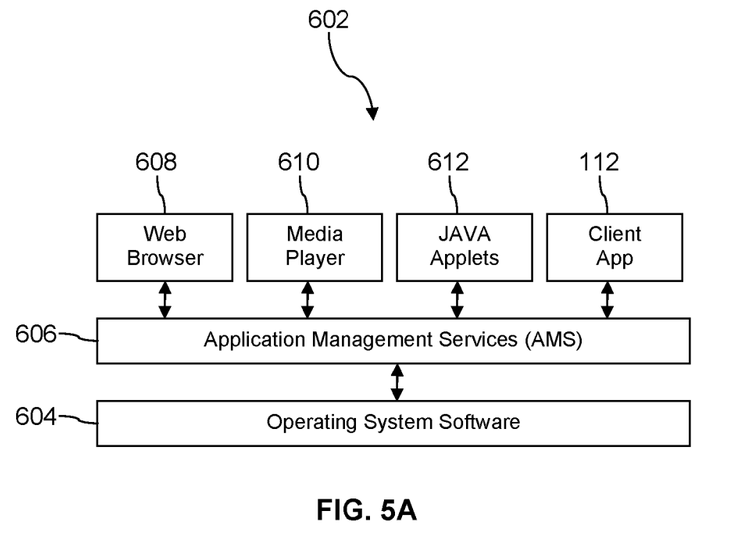
FIG. 5A is a block diagram of a software architecture of a user equipment according to an embodiment of the disclosure.

FIG. 5A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the UE 400. Also shown in FIG. 5A are a web browser application 608, a media player application 610, and JAVA applets 612 and the personal quality metric client application 112. In an embodiment, a third party application 614 may be installed on the mobile communication device 400. The web browser application 608 may be executed by the UE 400 to browse content and/or the Internet, for example when the UE 400 is coupled to a network via a wireless link. The web browser application 608 may permit a user to enter information into forms and select links to retrieve and view web pages. The media player application 610 may be executed by the UE 400 to play audio or audiovisual media. The JAVA applets 612 may be executed by the UE 400 to provide a variety of functionality including games, utilities, and other functionality.

Figure 5B:
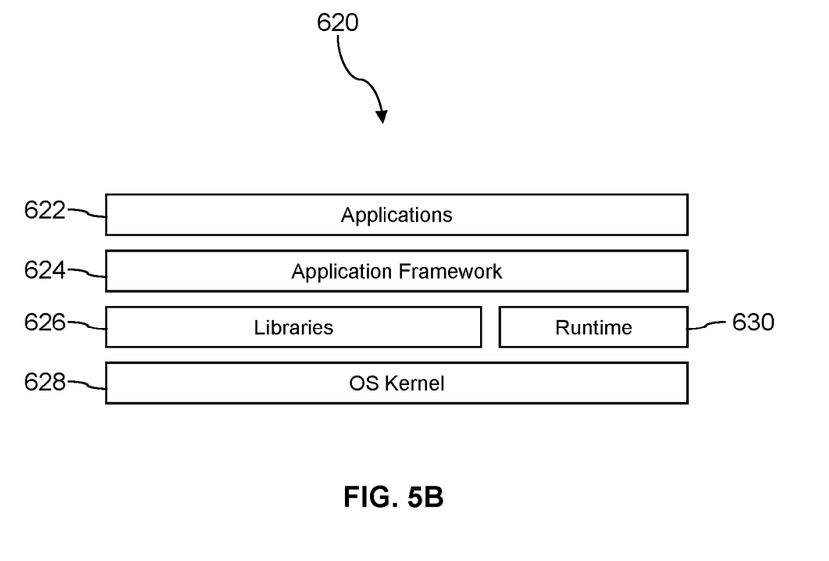
FIG. 5B is a block diagram of another software architecture of a user equipment according to an embodiment of the disclosure.

FIG. 5B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 6:
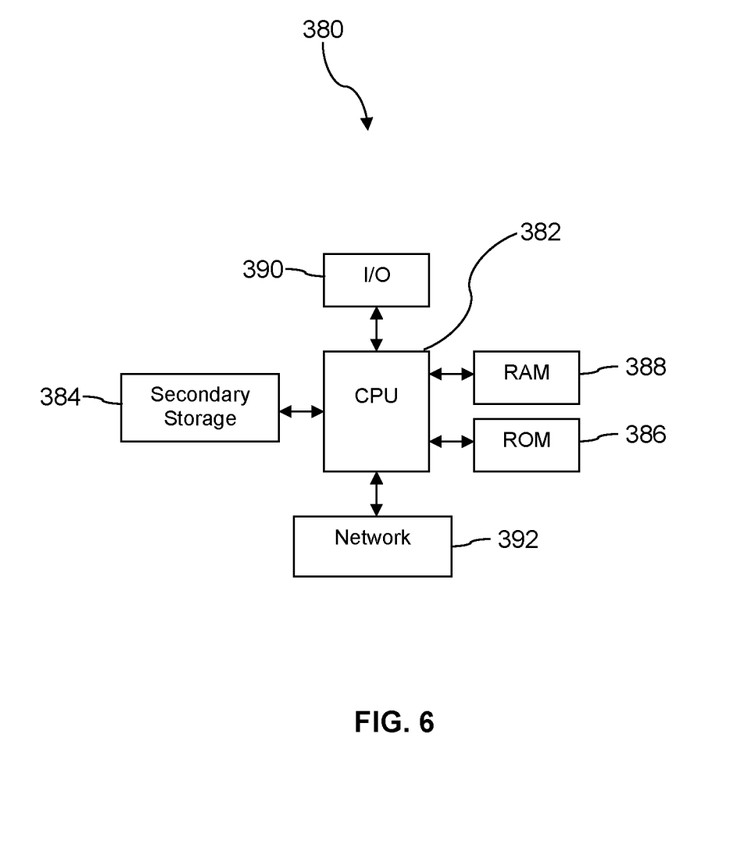
FIG. 6 is a block diagram of a computer system according to an embodiment of the disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A computer system for analyzing mobile communication performance data from a plurality of different wireless communication service provider networks to provide competitive comparison information to user equipment (UE) users for use in choosing to subscribe with a wireless communication service provider, comprising:
   a processor;
   a non-transitory memory; and
   an application stored in the non-transitory memory that, when executed by the processor:
      reads performance data from a data store, where the performance data comprises wireless communication service performance data collected by a client application executing on each of a plurality of UEs and transmitted by the client application to the data store irrespective of the wireless communication service provider network from which the associated UE receives wireless coverage, each of the different wireless communication service provider networks provide wireless communication service to at least some of the plurality UEs, the performance data identifies one of the wireless communication service provider networks as being the context of the performance data, and the performance data comprises network download speed of the wireless communication service provider network that is the context of the performance data,
      analyzes the performance data read from the data store to determine performance statistics for each of the different wireless communication service provider networks, where one of the performance statistics comprises a data download speed performance statistic,
      receives a personal quality criteria from each of the plurality of UEs, where each personal quality criteria comprises wireless communication service quality factors that matter to a user of a corresponding UE, a plurality of user specified weights for each of the wireless communication service quality factors, and a definition for calculating a personal wireless communication service quality metric for the user based on weighting each of the wireless communication service factors according to a corresponding user specified weight of the plurality of user specified weights,
      determines a personal wireless communication service quality metric for each of the different wireless communication service provider networks for each of the plurality of UEs using the definition in the personal quality criteria associated with the UE and based on the performance statistics, and
      transmits the personal wireless communication service quality metrics for each of the different wireless communication service provider networks determined for a first UE to the first UE in response to receiving a request for the personal wireless communication service quality metrics from the first UE, whereby a choice by a user of the first UE to subscribe to one of the wireless communication service providers is informed by the personal wireless communication service quality metrics sent to the first UE.

2. The computer system of claim 1, wherein each of the UEs is one of a mobile phone, a smart phone, a feature phone, a personal digital assistant (PDA), a media player, a wearable computer, a headset computer, a laptop computer, a tablet computer, or a notebook computer.

3. The computer system of claim 1, wherein the performance statistics comprise at least two of jitter data, latency data, data download reliability data, voice call quality, and dropped call data, blocked call data.

4. The computer system of claim 1, wherein the wireless communication service provided to the UEs is provided according to at least one of a long term evolution (LTE), a code division multiple access (CDMA), a global system for mobile communications (GSM), or a worldwide interoperability for microwave access (WiMAX) wireless telecommunications protocol.

5. The computer system of claim 1, wherein the performance data further identifies a location in which the performance data is collected.

6. The computer system of claim 1, wherein the personal wireless communication service quality metric is determined by multiplying the user specified weights times corresponding performance statistics.

7. The computer system of claim 6, wherein the performance statistics are normalized to a restricted predefined range before multiplying by the weights.

8. A user equipment (UE), comprising:
a radio transceiver;
a processor;
a display;
a non-transitory memory; and
a client application stored in the non-transitory memory that, when executed by the processor:
presents prompts on the display to guide a user through inputting a personal wireless communication service quality criteria associated to the user, where the personal wireless communication service quality criteria comprises wireless communication service quality factors that matter to the user of the UE, a plurality of user specified weights for each of the wireless communication service quality factors, and a definition for calculating a personal wireless communication service quality metric for the user based on weighting each of the wireless communication service factors according to a corresponding user specified weight of the plurality of user specified weights,
receives personal wireless communication service quality criteria inputs,
transmits the personal wireless communication service quality criteria inputs to one of a server application or a data store via the radio transceiver,
creates wireless communication service performance data based on wireless communication service experienced by the UE, where the performance data comprises an identity of a wireless communication service provider network that is a context for the performance data,
transmits the wireless communication service performance data to one of the server application or the data store,
receives a personal wireless communication service quality metric determined using the definition in the personal wireless communication service quality criteria from the server application, where the personal wireless communication service quality metric represents the quality of wireless communication service received by the UE based on the personal wireless communication service quality criteria inputs and wireless communication service performance data transmitted by the UE to the server application or the data store and based on the wireless communication service performance data transmitted by other UEs irrespective of the wireless communication service provider network from which the UEs receive wireless coverage to one of the server application or the data store, and
presents the personal wireless communication service quality metric on the display,
whereby a user of the UE is able to make an informed choice of one of a wireless communication service providers to subscribe to.

9. The user equipment of claim 8, wherein the performance data comprises at least one of network download speed, data download reliability, jitter, latency, dropped calls, and blocked calls.

10. The user equipment of claim 8, wherein the performance data comprises one of a count over a predefined time interval or a rate of an event over a predefined time interval.

11. The user equipment of claim 8, wherein the client application further presents prompts on the display to guide a user through inputting restrictions on performance data transmitted by the UE.

12. The user equipment of claim 11, wherein the restriction removes location information from the performance data.

13. The user equipment of claim 11, wherein the restriction limits the accuracy of location information transmitted with the performance data.

14. The user equipment of claim 11, wherein the restriction excludes some kinds of performance data from transmission by the UE.

15. A method of managing user equipment wireless communication service performance based on a personal quality criteria, comprising:
reading performance data from a data store, where the performance data comprises wireless communication performance data transmitted to the data store by a plurality of user equipments (UEs) irrespective of which of a plurality of different wireless communication service provider networks the UEs receive wireless coverage from, the performance data identifies a wireless communication service provider network that is the context of the performance data, and the performance data comprises at least three of a network download speed, data reliability data, dropped calls data, call blocking data, and data buffering data;
receiving a plurality of personal wireless communication service quality metric definitions, wherein each personal wireless communication service quality metric definition identifies at least one performance data item and weighting pair, whereby wireless communication quality factors that matter to a user of a UE are defined;
calculating personal quality metrics for each of the plurality of wireless communication service provider networks for each of the plurality of received personal wireless communication service quality metric definitions, where each personal quality metric is calculated based on the associated metric definition and the performance data read from the data store; and configuring a network-of-networks comprised of the plurality of wireless communication service provider networks to provision at least some of the UEs to the service provider network associated with the highest personal quality metric for each UE and wherein at least some of the UEs are provisioned to different service provider networks at different times to maintain a high personal quality metric for the UEs under different operating conditions.

16. The method of claim 15, further comprising receiving performance data from the UEs.

17. The method of claim 15, further comprising normalizing the performance data to restrict values to a predefined range of values.

18. The method of claim 15, wherein the calculating of personal quality metrics is performed periodically.

19. The method of claim 15, wherein the calculation of personal quality metrics is performed based on performance data from a most recent predefined period of time.

20. The method of claim 15, wherein the UEs are each one of a mobile phone, a smart phone, a feature phone, a personal digital assistant (PDA), a media player, a wearable computer, a headset computer, a laptop computer, a tablet computer, or a notebook computer.

* * * * *